United States Patent
Kanoh

(10) Patent No.: US 11,377,150 B2
(45) Date of Patent: Jul. 5, 2022

(54) VEHICLE CONTROL APPARATUS, VEHICLE, AND CONTROL METHOD

(71) Applicant: HONDA MOTOR CO., LTD., Tokyo (JP)

(72) Inventor: Tadahiko Kanoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/928,105

(22) Filed: Jul. 14, 2020

(65) Prior Publication Data

US 2020/0339194 A1   Oct. 29, 2020

Related U.S. Application Data

(63) Continuation of application No. PCT/JP2018/001557, filed on Jan. 19, 2018.

(51) Int. Cl.
*B62D 15/02*    (2006.01)
*B62D 6/00*    (2006.01)

(52) U.S. Cl.
CPC ............. *B62D 15/026* (2013.01); *B62D 6/00* (2013.01)

(58) Field of Classification Search
CPC ................ B62D 15/026; B62D 15/025; B62D 15/0265; B62D 6/00
See application file for complete search history.

(56) References Cited

U.S. PATENT DOCUMENTS

| | | | |
|---|---|---|---|
| 2015/0203126 A1* | 7/2015 | Kobana | B60K 28/06 701/93 |
| 2018/0348758 A1* | 12/2018 | Nakamura | B60W 30/12 |
| 2020/0283025 A1* | 9/2020 | Honda | B60R 21/00 |

FOREIGN PATENT DOCUMENTS

| | | | |
|---|---|---|---|
| JP | 2004/078333 A | | 3/2004 |
| JP | 2004078333 A | * | 3/2004 |
| JP | 2004/206275 A | | 7/2004 |
| JP | 2005/145153 A | | 6/2005 |
| JP | 2005/157754 A | | 6/2005 |
| JP | 2005145153 A | * | 6/2005 |
| JP | 2005157754 A | * | 6/2005 |
| JP | 2009/166559 A | | 7/2009 |
| JP | 2009166559 A | * | 7/2009 |

(Continued)

OTHER PUBLICATIONS

International Search Report for PCT/JP2018/001557 dated Apr. 17, 2018.

*Primary Examiner* — Scott A Reinbold
(74) *Attorney, Agent, or Firm* — Thomas | Horstemeyer, LLP

(57) ABSTRACT

The present invention provides a vehicle control apparatus for performing traveling control of a vehicle, the apparatus comprising: a detection unit configured to detect a peripheral status of the vehicle; a determination unit configured to determine, based on a detection result of the detection unit, whether a preceding vehicle exhibits a predetermined behavior in a vehicle width direction; and a control unit configured to perform steering control of the vehicle, wherein steering control modes of the vehicle include a first mode and a second mode, and wherein in a case where the determination unit determines that the preceding vehicle exhibits the predetermined behavior during the steering control of the vehicle in the first mode, the control unit changes from the first mode to the second mode and performs the steering control of the vehicle in the second mode.

19 Claims, 6 Drawing Sheets

(56) References Cited

FOREIGN PATENT DOCUMENTS

| | | | |
|---|---|---|---|
| JP | 2010/198513 A | | 9/2010 |
| JP | 2010198513 A | * | 9/2010 |
| JP | 2013/067365 A | | 4/2013 |
| JP | 2013067365 A | * | 4/2013 |
| WO | 2019/142312 A1 | | 7/2019 |

* cited by examiner

VEHICLE CONTROL APPARATUS, VEHICLE, AND CONTROL METHOD

CROSS-REFERENCE TO RELATED APPLICATION(S)

This application is a continuation of International Patent Application No. PCT/JP2018/001557 filed on Jan. 19, 2018, the entire disclosures of which is incorporated herein by reference.

TECHNICAL FIELD

The present invention relates to a vehicle control technique.

BACKGROUND ART

PTL 1 discloses a control system in which if, during traveling under first traveling control for controlling traveling of a self-vehicle based on a recognition result of a white line (lane mark), it is judged that the first traveling control is impossible because recognized white line positions largely vary, the control is switched to second traveling control for controlling traveling of the self-vehicle to follow a preceding vehicle.

CITATION LIST

Patent Literature

PTL 1: Japanese Patent Laid-Open No. 2004-206275

SUMMARY OF INVENTION

Technical Problem

When controlling traveling of the self-vehicle to follow a preceding vehicle, the vehicle follows even staggering or the like of the preceding vehicle. Hence, from the viewpoint of stability in traveling, the traveling of the self-vehicle is preferably controlled based on the recognition result of a white line. On the other hand, if an obstacle or the like exists on the traveling lane, the obstacle can be avoided at a high possibility by controlling the traveling of the self-vehicle in accordance with the obstacle avoidance action of the preceding vehicle.

It is an object of the present invention to appropriately avoid an obstacle on a traveling lane.

Solution to Problem

According to the present invention, there is provided a vehicle control apparatus for performing traveling control of a vehicle, the apparatus comprising: a detection unit configured to detect a peripheral status of the vehicle; a determination unit configured to determine, based on a detection result of the detection unit, whether a preceding vehicle exhibits a predetermined behavior in a vehicle width direction; and a control unit configured to perform steering control of the vehicle, wherein steering control modes of the vehicle include a first mode in which the steering control of the vehicle is performed based on a division line detected by the detection unit, and a second mode in which the steering control of the vehicle is performed based on the preceding vehicle detected by the detection unit, and wherein in a case where the determination unit determines that the preceding vehicle exhibits the predetermined behavior during the steering control of the vehicle in the first mode, the control unit changes from the first mode to the second mode and performs the steering control of the vehicle in the second mode.

Advantageous Effects of Invention

According to the present invention, it is possible to appropriately avoid an obstacle on a traveling lane.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate an embodiment of the invention and, together with the description, serve to explain the principles of the invention.

DESCRIPTION OF EMBODIMENTS

Figure 1:
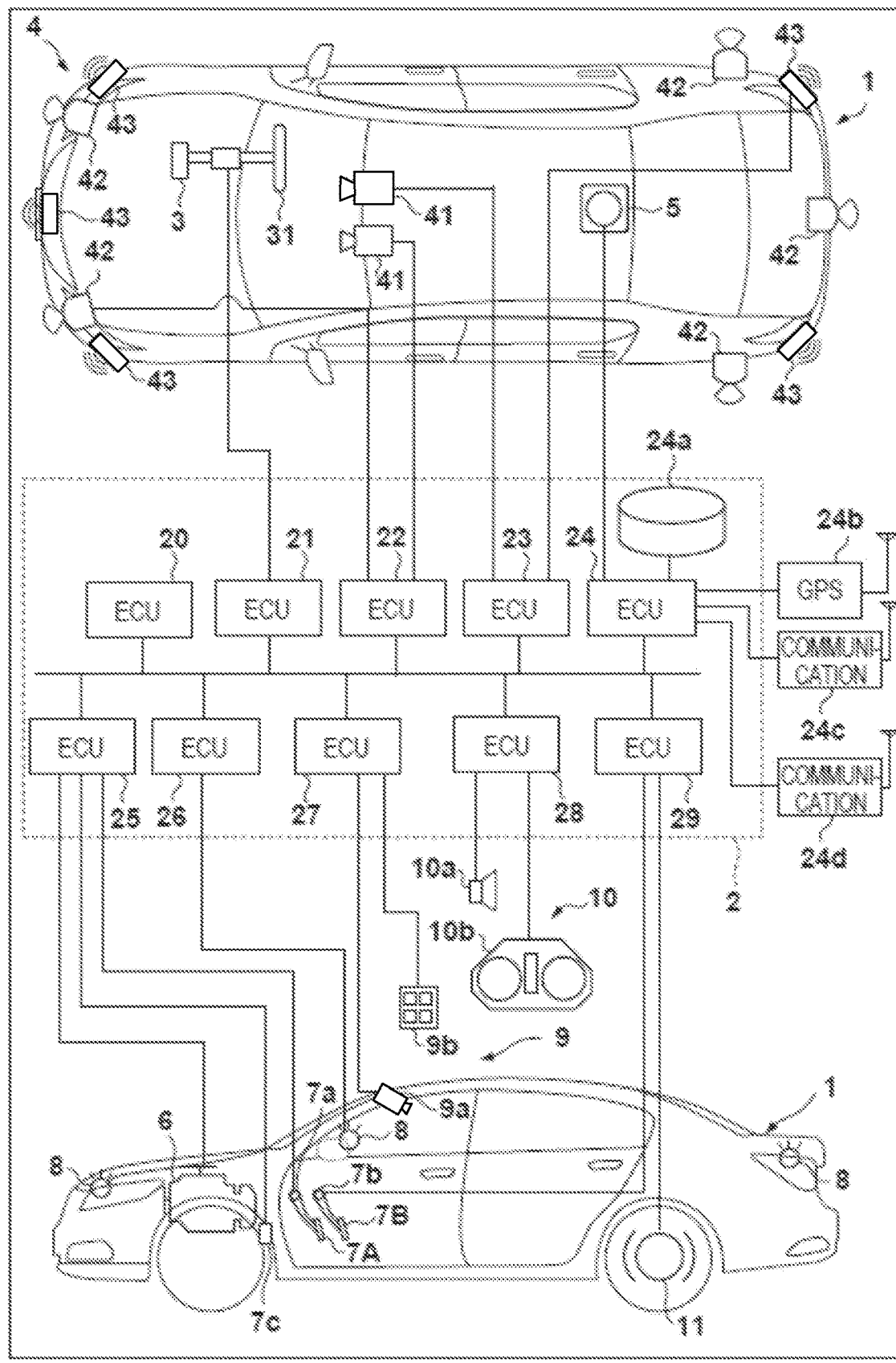
FIG. 1 is a block diagram of a vehicle control apparatus according to an embodiment of the present invention.

FIG. 1 is a block diagram of a vehicle control apparatus according to an embodiment of the present invention. The vehicle control apparatus shown in FIG. 1 is an apparatus that controls automated driving of a vehicle 1. Referring to FIG. 1, an outline of the vehicle 1 is shown in a plan view and a side view. As an example, the vehicle 1 is a sedan-type four-wheeled vehicle.

The control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, and an interface with an external device. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the advancing direction of the vehicle 1.

The ECUs 22 and 23 perform control of detection units 41 to 43 that detect the peripheral status of the vehicle 1 and information processing of detection results. The detection unit 41 is a camera (to be sometimes referred to as the camera 41 hereinafter) that captures the front side of the vehicle 1. In this embodiment, two cameras 41 are provided at the roof front of the vehicle 1. When images captured by the cameras 41 are analyzed, the contour of a target or a division line (a white line or the like) of a lane on a road can be extracted. This enables the ECUs 22 and 23 to recognize a pedestrian on the front side, the type (a large-sized car, a standard-sized, or the like) of a vehicle on the front side, road information (a sidewalk, a road shoulder, a traveling road, or the like), or an obstacle on the road.

The detection unit 42 is a lidar (Light Detection and Ranging; to be sometimes referred to as the lidar 42 hereinafter), and detects a target around the vehicle 1 or measures the distance to a target. In this embodiment, five lidars 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each lidar 42 and information processing of detection results. The ECU 23 performs control of the other camera 41 and each radar 43 and information processing of detection results. Since two sets of devices that detect the peripheral status of the vehicle 1 are provided, the reliability of detection results can be improved. In addition, since detection units of different types such as cameras, lidars, and radars are provided, the peripheral environment of the vehicle can be analyzed multilaterally. Furthermore, each of the ECUs 22 and 23 can also detect the relative speed between the vehicle 1 and a target around the vehicle 1 based on the distance between the vehicle 1 and the target measured by the lidars 42 and the radars 43, or detect the absolute speed of a target around the vehicle 1 further based on the absolute speed information of the vehicle 1.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination. The ECU 24 includes a communication device 24d for inter-vehicle communication. The communication device 24d performs wireless communication with another vehicle on the periphery and performs information exchange between the vehicles.

The ECU 25 controls a power plant 6. The power plant 6 is a mechanism that outputs a driving force to rotate the driving wheels of the vehicle 1 and includes, for example, an engine and a transmission. The ECU 25, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 25 automatically controls the power plant 6 in correspondence with an instruction from the ECU 20 and controls the acceleration/deceleration of the vehicle 1.

The ECU 26 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 27 performs control of a detection unit 9 that detects the status in the vehicle and information processing of a detection result. As the detection unit 9, a camera 9a configured to capture the inside of the vehicle and an input device 9b configured to accept input of information from an occupant in the vehicle are provided. In this embodiment, the camera 9a is provided at the roof front of the vehicle 1, and captures the occupant (for example, the driver) in the vehicle. The input device 9b is a switch group arranged at a position where the occupant in the vehicle can operate the device and configured to input instructions to the vehicle 1.

The ECU 28 controls an output device 10. The output device 10 outputs information to the driver and accepts input of information from the driver. A voice output device 10a notifies the driver of the information by a voice. A display device 10b notifies the driver of information by displaying an image. The display device 10b is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light.

The ECU 29 controls a brake device 11 and a parking brake (not shown). The brake device 11 is, for example, a disc brake device which is provided for each wheel of the vehicle 1 and decelerates or stops the vehicle 1 by applying a resistance to the rotation of the wheel. The ECU 29, for example, controls the operation of the brake device 11 in correspondence with a driving operation (brake operation) of the driver detected by an operation detection sensor 7b provided on a brake pedal 7B. If the driving state of the vehicle 1 is automated driving, the ECU 29 automatically controls the brake device 11 in correspondence with an instruction from the ECU 20 and controls deceleration and stop of the vehicle 1. The brake device 11 or the parking brake can also be operated to maintain the stop state of the vehicle 1. In addition, if the transmission of the power plant 6 includes a parking lock mechanism, it can be operated to maintain the stop state of the vehicle 1.

In the vehicle 1 with the above-described arrangement, at the time of automated driving, the ECU 20 performs steering control of the vehicle 1 in one of a plurality of modes including a lane maintaining mode and a preceding vehicle following mode. The lane maintaining mode (first mode) is a mode in which steering control of the vehicle 1 is performed along a lane based on a division line detected by the detection units 41 to 43 (in particular, the detection units 41). In the lane maintaining mode, for example, steering control of the vehicle 1 can be performed such that the vehicle travels at the center of a lane (vehicle width direction) as much as possible. The preceding vehicle following mode (second mode) is a mode in which steering control of the vehicle 1 is performed to follow a preceding vehicle, that is, to trace the traveling locus of a preceding vehicle based on the preceding vehicle detected by the detection units 41 to 43.

Figure 2:
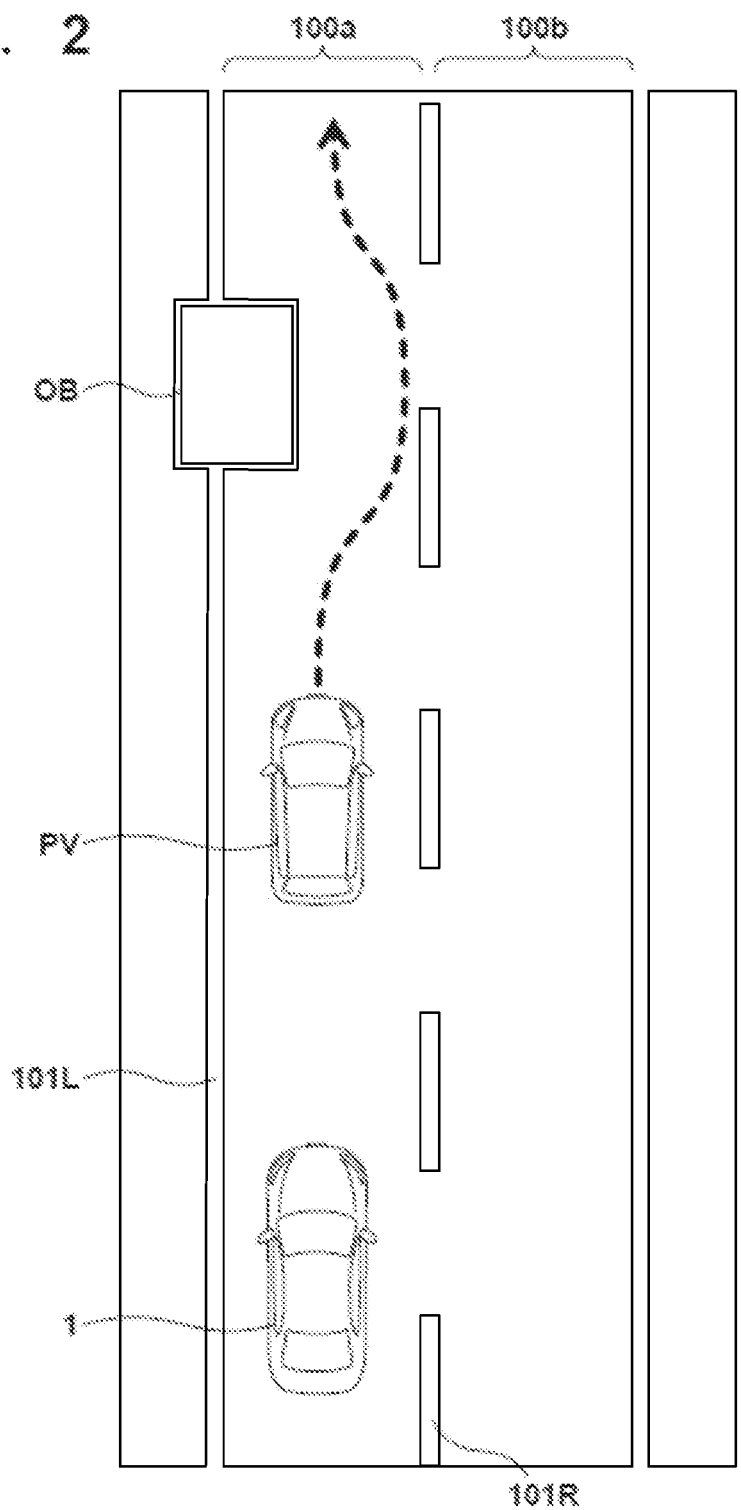
FIG. 2 is a schematic view for explaining steering control of a vehicle according to the embodiment.

When performing steering control of the vehicle 1 in the preceding vehicle following mode, the vehicle can follow even staggering or the like of the preceding vehicle. Hence, in normal automated driving, steering control of the vehicle 1 is preferably performed in the lane maintaining mode from the viewpoint of stability in traveling, which is directly associated with comfort in riding. On the other hand, for example, as shown in FIG. 2, in a case in which an obstacle OB (for example, a lost item, a stopped vehicle, a construction site, or the like) is present on a traveling lane 100a, the detection units 41 to 43 may be unable to detect the obstacle because of a dead angle made by a preceding vehicle PV until the preceding vehicle PV moves in the vehicle width direction and avoids the obstacle. In this case, by applying the preceding vehicle following mode and performing steering control of the vehicle 1 in accordance with the avoidance action of the preceding vehicle PV for the obstacle OB, the vehicle 1 can also travel to avoid the obstacle OB.

Upon determining that the preceding vehicle PV exhibits a predetermined behavior in the vehicle width direction during steering control in the lane maintaining mode, the ECU 20 according to this embodiment changes the mode from the lane maintaining mode to the preceding vehicle following mode and performs steering control of the vehicle 1. If the preceding vehicle PV exhibits a predetermined behavior in the vehicle width direction, the preceding vehicle PV is making an avoidance action for an obstacle on the traveling lane at a high possibility. Hence, when the mode is changed from the lane maintaining mode to the preceding vehicle following mode, and steering control of the vehicle 1 is performed to follow the preceding vehicle PV, the vehicle 1 can avoid the obstacle, like the preceding vehicle PV.

Figure 3:
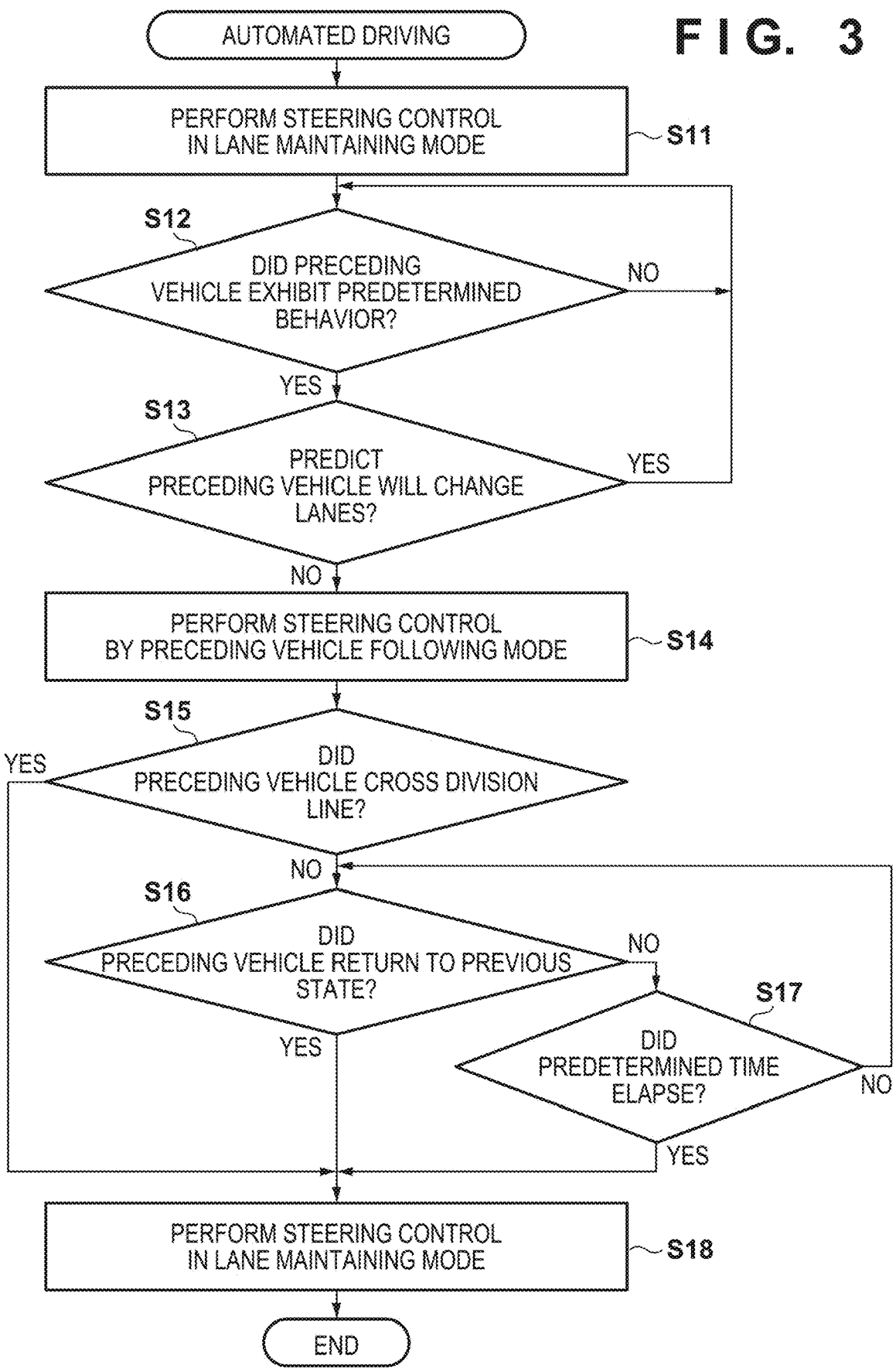
FIG. 3 is a flowchart showing an example of control of the vehicle according to the embodiment.

An example of control of the vehicle 1, which is executed by the ECU 20 according to this embodiment, will be described below with reference to FIG. 3. FIG. 3 is a flowchart showing an example of control of the vehicle 1 executed when, for example, the driver of the vehicle 1 instructs automated driving. In the flowchart of FIG. 3, when the start of automated driving is instructed, the steering control mode is set to the lane maintaining mode. The ECU 20 functions as the control apparatus of the vehicle 1.

In step S11, the ECU 20 performs steering control of the vehicle 1 in the lane maintaining mode. For example, as shown in FIG. 2, the ECU 20 performs steering control of the vehicle 1 such that it travels at the center (vehicle width direction) of the traveling lane 100a as much as possible based on left and right division lines (white lines) 101L and 101R of the traveling lane 100a detected by the detection units 41 to 43. At this time, the ECU 20 can also perform traveling control of the vehicle 1 such that the inter-vehicle distance to the preceding vehicle PV detected by the detection units 41 to 43 is maintained at a predetermined distance.

In step S12, the ECU 20 determines, based on the detection results of the detection units 41 to 43, whether the preceding vehicle PV exhibits a predetermined behavior in the vehicle width direction. Upon determining that the preceding vehicle PV exhibits a predetermined behavior, the process advances to step S13. Upon determining that the preceding vehicle PV does not exhibit a predetermined behavior, step S12 is repetitively performed. Note that if the preceding vehicle PV does not exist, step S12 is repetitively performed.

Figure 4:
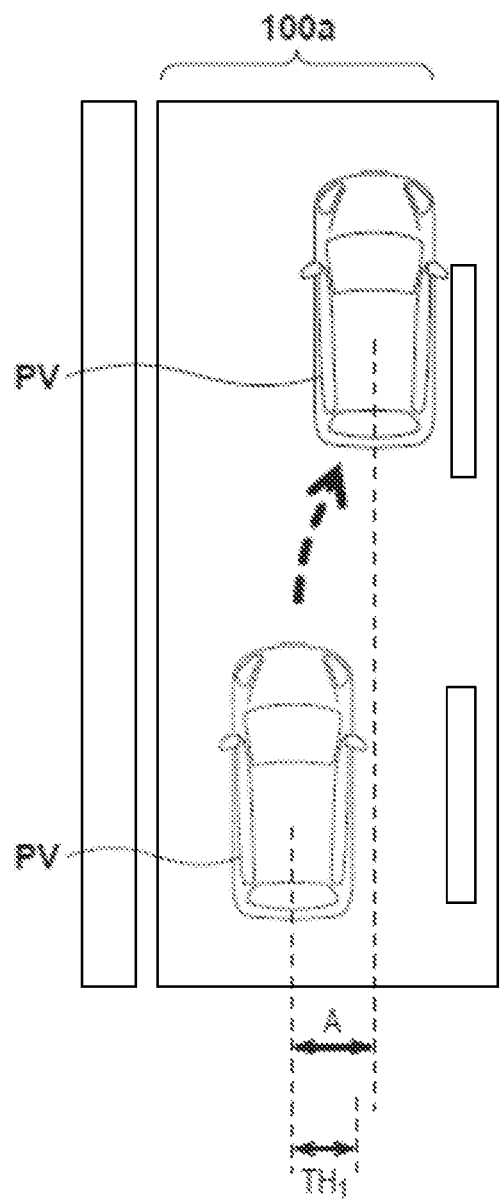
FIG. 4 is a view showing an example of determination concerning a predetermined behavior of a preceding vehicle.

The predetermined behavior includes an operation of moving vehicle in the vehicle width direction. For example, as the criterion of judgment of the predetermined behavior, as shown in FIG. 4, the ECU 20 can determine whether a moving amount A of the preceding vehicle PV in the vehicle width direction exceeds a threshold $TH_1$ (first threshold). That is, if the moving amount A of the preceding vehicle PV in the vehicle width direction exceeds the threshold $TH_1$, the ECU 20 can determine that the preceding vehicle PV exhibits a predetermined behavior.

Figure 5:
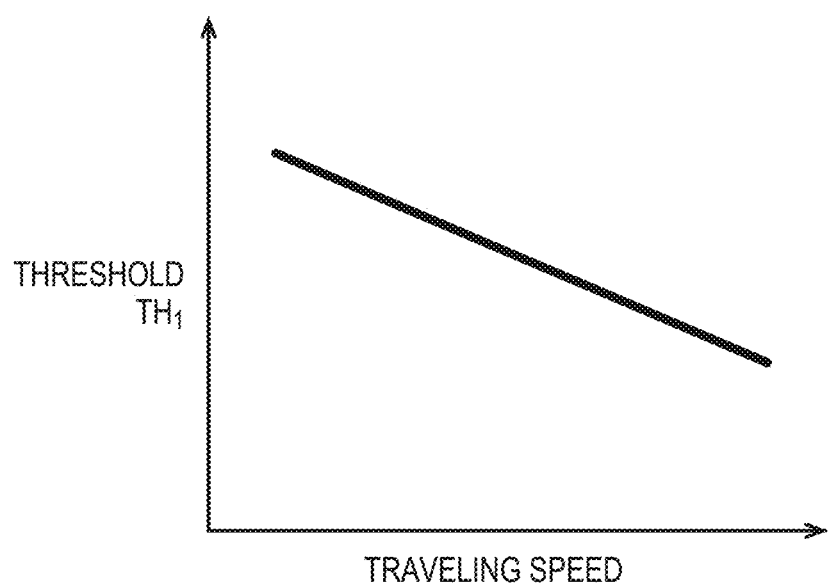
FIG. 5 is a graph showing the relationship between a traveling speed and a threshold.

If the speed (to be also referred to as a traveling speed hereinafter) of the vehicle 1 or the preceding vehicle PV in the advancing direction increases, the time to reach the obstacle OB becomes short. Hence, the ECU 20 preferably instantaneously judges the predetermined behavior of the preceding vehicle PV. To do this, the ECU 20 may change the threshold $TH_1$ in accordance with the traveling speed. More specifically, the ECU 20 acquires, in advance, information representing the relationship between the traveling speed and the threshold $TH_1$ as shown in FIG. 5, and decides, based on the information, the threshold $TH_1$ to be used for the current traveling speed. In the example of information shown in FIG. 5, setting is done such that the threshold $TH_1$ becomes small as the traveling speed increases.

Additionally, the ECU 20 preferably instantaneously judges the predetermined behavior of the preceding vehicle PV such that the vehicle 1 can avoid the obstacle OB even if, for example, the preceding vehicle PV abruptly moves in the vehicle width direction to avoid the obstacle OB. In this case, since the moving speed of the preceding vehicle PV in the vehicle width direction increases, the ECU 20 may change the threshold $TH_1$ in accordance with the moving speed of the preceding vehicle PV in the vehicle width direction such that the threshold $TH_1$ becomes small as the moving speed of the preceding vehicle PV in the vehicle width direction increases.

As an example of the method of judging the predetermined behavior, the following method can also be used. For example, as the criterion of judgment of the predetermined behavior, the ECU 20 may determine whether the moving speed of the preceding vehicle PV in the vehicle width direction exceeds a threshold $TH_2$ (second threshold). In this case, if the moving speed of the preceding vehicle PV in the vehicle width direction exceeds the threshold $TH_2$, the ECU 20 can determine that the preceding vehicle exhibits a predetermined behavior. Here, the ECU 20 may change the threshold $TH_2$ in accordance with the traveling speed, like the above-described threshold $TH_1$ for the moving amount of the preceding vehicle PV. More specifically, the ECU 20 can change the threshold $TH_2$ such that the threshold $TH_2$ becomes small as the traveling speed increases.

Figure 6:
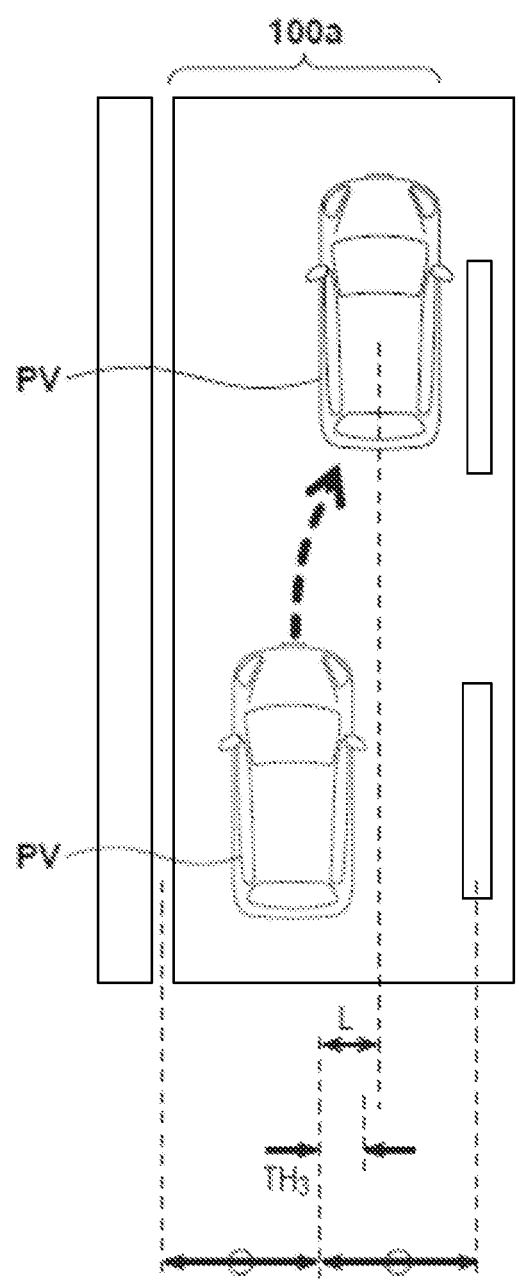
FIG. 6 is a view showing an example of determination concerning a predetermined behavior of the preceding vehicle.

Furthermore, as the criterion of judgment of the predetermined behavior, the ECU 20 can determine whether the preceding vehicle PV moves in the vehicle width direction, and a distance L between the preceding vehicle PV and a reference position in the traveling lane 100a exceeds a threshold $TH_3$ (third threshold). In this case, if the distance L exceeds the threshold $TH_3$, the ECU 20 can determine that the preceding vehicle PV exhibits a predetermined behavior. The reference position can be set to one of, for example, the center position of the traveling lane 100$a$ in the vehicle width direction, the position of the preceding vehicle PV in the vehicle width direction, which has traveled a predetermined distance before exhibiting a predetermined behavior, and the position of the vehicle 1 in the vehicle width direction before exhibiting a predetermined behavior. If the reference position is set to the center position of the traveling lane 100$a$ in the vehicle width direction, the ECU 20 can determine that the preceding vehicle PV exhibits a predetermined behavior when the distance L between the preceding vehicle PV and the center position exceeds the threshold $TH_3$, as shown in FIG. 6.

In step S13, the ECU 20 predicts whether the preceding vehicle PV will make a lane change. Even if it is determined in step S12 that the preceding vehicle PV exhibits a predetermined behavior, the predetermined behavior may be not an operation of avoiding an obstacle on the traveling lane 100$a$ but an operation of making a lane change to an adjacent traveling lane 100$b$ (adjacent lane). In this case, if the steering control mode is changed from the lane maintaining mode to the preceding vehicle following mode, steering control of the vehicle 1 is done such that it makes a lane change following the preceding vehicle PV. For this reason, in step S13, the ECU 20 predicts whether the preceding vehicle PV will make a lane change. If a lane change of the preceding vehicle PV is predicted, the process returns to step S12 to stop the change to the preceding vehicle following mode. For example, if the detection units 41 to 43 detect the operation of the direction indicators (turn signals) of the preceding vehicle PV, the ECU 20 can predict that the preceding vehicle PV will make a lane change. If the detection units 41 to 43 detect that the preceding vehicle PV moves across (traveled over) a division line, the ECU 20 can predict a lane change of the preceding vehicle PV. On the other hand, if a lane change of the preceding vehicle PV is not predicted, the process advances to step S14.

In step S14, the ECU 20 changes the steering control mode of the vehicle 1 from the lane maintaining mode to the preceding vehicle following mode, and performs steering control of the vehicle 1 in the preceding vehicle following mode. Accordingly, the vehicle can travel to follow the avoidance operation of the preceding vehicle PV for the obstacle, that is, trace the traveling locus of the preceding vehicle that is performing the avoidance operation, and avoid the obstacle.

Here, the ECU 20 may set each of the threshold $TH_1$, the threshold $TH_2$, and the threshold $TH_3$ used to judge the predetermined behavior of the preceding vehicle PV in step S12 to a plurality of levels. For example, a case in which the thresholds $TH_1$ of two levels are set in an example in which the threshold $TH_1$ is used to judge the predetermined behavior of the preceding vehicle PV will be assumed. In this case, if the behavior (the moving amount A of the preceding vehicle in the vehicle width direction) of the preceding vehicle exceeds the threshold $TH_1$ of the first level, in step S14, the ECU 20 changes the steering control mode of the vehicle 1 from the lane maintaining mode to the preceding vehicle following mode and performs steering control of the vehicle 1 in the preceding vehicle following mode. If the moving amount exceeds the threshold $TH_1$ of the second level, which is larger than the threshold $TH_1$ of the first level, in addition to the steering control of the vehicle 1 in the preceding vehicle following mode, the ECU 20 can further make a "hands-on (steering wheel holding) request" or "driving exchange request" to the driver, via the display device 10.

In addition, the ECU 20 may change each of the threshold $TH_1$, the threshold $TH_2$, and the threshold $TH_3$ used to judge the predetermined behavior of the preceding vehicle PV in step S12 in accordance with the type of an adjacent area adjacent to the traveling lane 100$a$ of the vehicle 1. For example, in an example in which the threshold $TH_1$ is used to judge the predetermined behavior of the preceding vehicle PV, the ECU 20 can change the threshold $TH_1$ depending on whether the adjacent area is a traveling lane (for example, a passing lane), a road shoulder, or an opposite lane. More specifically, as shown in FIG. 2, if one adjacent area of the traveling lane 100$a$ is the traveling lane 100$b$, and the other adjacent area is a road shoulder, the ECU 20 sets the threshold $TH_1$ larger in the direction of the road shoulder with a higher risk than in the direction of the traveling lane 100$b$. It is therefore possible to more easily follow the preceding vehicle PV in the direction of the traveling lane 100$b$ rather than in the direction of the road shoulder when avoiding the obstacle OB. Similarly, if one adjacent area of the traveling lane 100$a$ is an opposite lane, and the other adjacent area is a road shoulder, the ECU 20 sets the threshold $TH_1$ larger in the direction of the opposite lane with a higher risk than in the direction of the road shoulder. It is therefore possible to more easily follow the preceding vehicle PV in the direction of the road shoulder rather than in the direction of the opposite lane when avoiding the obstacle OB. That is, the ECU 20 can set the threshold $TH_1$ such that traveling lane<road shoulder<opposite lane is satisfied. Note that the ECU 20 can decide the type of the adjacent area based on, for example, the current position of the vehicle 1 detected by the GPS sensor 24$b$, map information acquired by the communication device 24$c$, or the like.

In step S15, the ECU 20 determines whether the detection units 41 to 43 detect that the preceding vehicle PV moves across (travelled over) a division line. If the preceding vehicle PV moves across a division line, the preceding vehicle PV makes a lane change at a high possibility. If steering control of the vehicle 1 is performed in the preceding vehicle following mode, the vehicle 1 makes a lane change following the preceding vehicle PV. Hence, upon determining that the preceding vehicle PV moves across a division line, the ECU 20 advances to step S18 to change the steering control mode of the vehicle 1 from the preceding vehicle following mode to the lane maintaining mode and perform steering control of the vehicle 1 in the lane maintaining mode. At this time, if the obstacle OB on the traveling lane 100$a$ is detected by the detection units 41 to 43, the ECU 20 performs steering control of the vehicle 1 not at the center of the traveling lane 100$a$ but to avoid the obstacle OB. On the other hand, upon determining that the preceding vehicle PV does not move across a division line, the process advances to step S16.

In step S16, the ECU 20 determines, based on the detection result of the detection units 41 to 43, whether the preceding vehicle PV returns to the state (to be also referred to as a "previous state" hereinafter) before exhibiting the predetermined behavior. For example, if the detection units 41 to 43 detect that the preceding vehicle returns to a predetermined range in the vehicle width direction including the above-described reference position (that is, a predetermined range set on the traveling lane 100$a$), the ECU 20 can determine that the preceding vehicle PV returns to the previous state. Upon determining that the preceding vehicle PV returns to the previous state, the process advances to step S18 to change the steering control mode of the vehicle 1 from the preceding vehicle following mode to the lane maintaining mode and perform steering control of the vehicle 1 in the lane maintaining mode. On the other hand, upon determining that the preceding vehicle PV does not return to the previous state, the process advances to step S17.

In step S17, the ECU 20 determines whether the detection units 41 to 43 do not detect an obstacle, and a predetermined time has elapsed from the change to the preceding vehicle following mode. If a predetermined time has elapsed, the process advances to step S18 to perform steering control of the vehicle 1 in the lane maintaining mode. On the other hand, if a predetermined time has not elapsed, the process returns to step S16 to determine whether the preceding vehicle returns to the previous state. Note that if the process of step S18 ends, the process may return to step S11 to repeat the processes of the flowchart of FIG. 3.

As described above, in this embodiment, upon determining that the preceding vehicle PV exhibits a predetermined behavior, the steering control mode of the vehicle 1 is changed from the lane maintaining mode to the preceding vehicle following mode to perform steering control of the vehicle 1 in the preceding vehicle following mode. This makes it possible to follow the preceding vehicle PV and perform an avoidance action for the obstacle OB on the traveling lane 100a.

Here, in this embodiment, the ECU 20 determines in step S12 whether the preceding vehicle PV exhibits a predetermined behavior. However, for example, it may further be determined whether a preceding vehicle traveling ahead of the preceding vehicle PV exhibits a predetermined behavior. In this case, upon determining that the preceding vehicle ahead of the preceding vehicle PV exhibits a predetermined behavior, the ECU 20 can change the steering control mode of the vehicle 1 to the preceding vehicle following mode and perform steering control of the vehicle 1 in the preceding vehicle following mode to follow the preceding vehicle PV. By determining the predetermined behavior of the preceding vehicle ahead of the preceding vehicle PV, it is possible to change the mode to the preceding vehicle following mode in an earlier stage and avoid the obstacle OB more safely.

Summary of Embodiment

1. A vehicle control apparatus according to the above-described embodiment is
a vehicle control apparatus for performing traveling control of a vehicle (for example, 1), comprising:
a detection unit (for example, 41-43) configured to detect a peripheral status of the vehicle;
a determination unit (for example, 20, 22, 23) configured to determine, based on a detection result of the detection unit, whether a preceding vehicle (for example, PV) exhibits a predetermined behavior in a vehicle width direction; and
a control unit (for example, 20) configured to perform steering control of the vehicle,
wherein steering control modes of the vehicle include a first mode in which the steering control of the vehicle is performed based on a division line detected by the detection unit, and a second mode in which the steering control of the vehicle is performed based on the preceding vehicle detected by the detection unit, and
wherein in a case where the determination unit determines that the preceding vehicle exhibits the predetermined behavior during the steering control of the vehicle in the first mode, the control unit changes from the first mode to the second mode and performs the steering control of the vehicle in the second mode.

According to this embodiment, at the time of normal traveling, steering control is performed in the first mode (lane maintaining mode) in which the traveling stability is relatively high. On the other hand, when the preceding vehicle exhibits a predetermined behavior, the mode is changed to the second mode (preceding vehicle following mode) to perform the steering control, thereby following the preceding vehicle to avoid an obstacle on the traveling lane.

2. In the above embodiment,
the determination unit determines, as a determination criterion of the predetermined behavior, whether a moving amount of the preceding vehicle in the vehicle width direction exceeds a first threshold.

According to this embodiment, it is possible to appropriately determine whether the preceding vehicle exhibits a predetermined behavior.

3. In the above embodiment,
the determination unit changes the first threshold in accordance with a speed of one of the vehicle and the preceding vehicle in an advancing direction.

According to this embodiment, even if the speed of the vehicle or the preceding vehicle in the advancing direction increases, the predetermined behavior of the preceding vehicle can be determined instantaneously.

4. In the above embodiment,
the determination unit changes the first threshold in accordance with the speed of the preceding vehicle in the vehicle width direction.

According to this embodiment, even if the preceding vehicle abruptly moves in the vehicle width direction, the predetermined behavior of the preceding vehicle can be determined instantaneously.

5. In the above embodiment,
the determination unit determines, as the determination criterion of the predetermined behavior, whether a moving speed of the preceding vehicle in the vehicle width direction exceeds a second threshold.

According to this embodiment, it is possible to appropriately determine whether the preceding vehicle exhibits a predetermined behavior.

6. In the above embodiment,
the determination unit changes the second threshold in accordance with the speed of one of the vehicle and the preceding vehicle in the advancing direction.

According to this embodiment, even if the speed of the vehicle or the preceding vehicle in the advancing direction increases, the predetermined behavior of the preceding vehicle can be determined instantaneously.

7. In the above embodiment,
the determination unit determines, as the determination criterion of the predetermined behavior, whether a distance between the preceding vehicle and a reference position in a traveling lane exceeds a third threshold by movement of the preceding vehicle in the vehicle width direction.

According to this embodiment, it is possible to appropriately determine whether the preceding vehicle exhibits a predetermined behavior.

8. In the above embodiment,
the reference position is set to one of a center position of the traveling lane in the vehicle width direction, a position of the preceding vehicle in the vehicle width direction before the preceding vehicle exhibits the predetermined behavior, and a position of the vehicle in the vehicle width direction before the preceding vehicle exhibits the predetermined behavior.

According to this embodiment, it is possible to more appropriately determine whether the preceding vehicle exhibits a predetermined behavior.

9. In the above embodiment, the determination unit changes, in accordance with a type of an adjacent area of the traveling lane on which the vehicle travels, a threshold to be used as the determination criterion of the predetermined behavior.

According to this embodiment, it is possible to change the easiness of following the preceding vehicle in accordance with the type of the adjacent area of the traveling lane.

10. In the above embodiment, the vehicle control apparatus further comprises a prediction unit (for example, 20) configured to predict a lane change of the preceding vehicle, and in a case where the prediction unit predicts the lane change of the preceding vehicle, the control unit stops changing from the first mode to the second mode.

According to this embodiment, it is possible to avoid making a lane change following the preceding vehicle.

11. In the above embodiment, in a case where the detection unit detects an operation of a direction indicator of the preceding vehicle, the prediction unit predicts that the preceding vehicle will perfume the lane change.

According to this embodiment, it is possible to appropriately predict the lane change of the preceding vehicle.

12. In the above embodiment, in a case where the detection unit detects that the preceding vehicle moves across the division line, the prediction unit predicts that the preceding vehicle will perform the lane change.

According to this embodiment, it is possible to appropriately predict the lane change of the preceding vehicle.

13. In the above embodiment, after changing from the first mode to the second mode, in a case where the preceding vehicle returns to a state before exhibiting the predetermined behavior, the control unit changes from the second mode to the first mode and performs the steering control of the vehicle in the first mode.

According to this embodiment, after an obstacle on the traveling lane is avoided, steering control can be performed in the first mode (lane maintaining mode) in which the traveling stability is relatively high.

14. In the above embodiment, after changing from the first mode to the second mode, in a case where the detection unit detects that the preceding vehicle moves across the division line, the control unit changes from the second mode to the first mode and performs the steering control of the vehicle in the first mode.

According to this embodiment, it is possible to avoid making a lane change following the preceding vehicle.

15. In the above embodiment, the determination unit further determines, based on the detection result of the detection unit, whether a second preceding vehicle traveling ahead the preceding vehicle exhibits the predetermined behavior in the vehicle width direction, and in a case where the determination unit determines that the second preceding vehicle exhibits the predetermined behavior during the steering control of the vehicle in the first mode, the control unit changes from the first mode to the second mode and performs the steering control of the vehicle in the second mode.

According to this embodiment, by determining the predetermined behavior of the second preceding vehicle ahead the preceding vehicle, it is possible to change the mode to the second mode (preceding vehicle following mode) in an earlier stage and avoid an obstacle on the traveling lane more safely.

The present invention is not limited to the above-described embodiment, and various changes and modifications can be made within the spirit and scope of the present invention. Therefore, to apprise the public of the scope of the present invention, the following claims are made.

REFERENCE SIGNS LIST

1 . . . vehicle, 2 . . . control unit, 20 . . . ECU, 41 . . . camera, 42 . . . lidar, 43 . . . radar

The invention claimed is:

1. A vehicle control apparatus for performing traveling control of a vehicle, the apparatus comprising:
a detector configured to detect a peripheral status of the vehicle; and
at least one processor with a memory comprising instructions, that when executed by the processor, cause the at least one processor to at least:
determine, based on a detection result of the detector, whether a preceding vehicle exhibits a predetermined behavior in a vehicle width direction; and
perform steering control of the vehicle in one of a plurality of modes, that include a first mode in which the steering control of the vehicle is performed based on a division line detected by the detector, and a second mode in which the steering control of the vehicle is performed based on the preceding vehicle detected by the detector,
wherein the predetermined behavior includes that a moving amount of the preceding vehicle in a first direction of the vehicle width direction exceeds a first threshold, and
wherein the at least one processor is configured to:
change the first threshold in accordance with a type of an adjacent area on a first direction side of a traveling lane on which the vehicle travels in the first direction of the vehicle width direction, and
in a case of determining that the preceding vehicle exhibits the predetermined behavior during the steering control of the vehicle in the first mode, change from the first mode to the second mode and perform the steering control of the vehicle in the second mode.

2. The vehicle control apparatus according to claim 1, wherein the at least one processor is configured to change the first threshold in accordance with a speed of one of the vehicle and the preceding vehicle in an advancing direction.

3. The vehicle control apparatus according to claim 1, wherein the at least one processor is configured to change the first threshold in accordance with a speed of the preceding vehicle in the vehicle width direction.

4. The vehicle control apparatus according to claim 1, wherein the predetermined behavior includes that a moving speed of the preceding vehicle in the vehicle width direction exceeds a second threshold.

5. The vehicle control apparatus according to claim 4, wherein the at least one processor is configured to change the second threshold in accordance with a speed of one of the vehicle and the preceding vehicle in an advancing direction.

6. The vehicle control apparatus according to claim 1, wherein the predetermined behavior includes that a distance between the preceding vehicle and a reference position in the traveling lane exceeds a third threshold by movement of the preceding vehicle in the vehicle width direction.

7. The vehicle control apparatus according to claim 6, wherein the reference position is set to one of a center position of the traveling lane in the vehicle width direction, a position of the preceding vehicle in the vehicle width direction before the preceding vehicle exhibits the predetermined behavior, and a position of the vehicle in the vehicle width direction before the preceding vehicle exhibits the predetermined behavior.

8. The vehicle control apparatus according to claim 1, wherein the at least one processor is configured to change the third threshold in accordance with the type of the adjacent area.

9. The vehicle control apparatus according to claim 1, wherein the at least one processor is configured to predict a lane change of the preceding vehicle, and stop in a case of predicting the lane change of the preceding vehicle, changing from the first mode to the second mode.

10. The vehicle control apparatus according to claim 9, wherein in a case where the detector unit detects an operation of a direction indicator of the preceding vehicle, the at least one processor is configured to predict that the preceding vehicle will perform the lane change.

11. The vehicle control apparatus according to claim 9, wherein in a case where the detector unit detects that the preceding vehicle moves across the division line, the at least one processor is configured to predict that the preceding vehicle will perform the lane change.

12. The vehicle control apparatus according to claim 1, wherein after changing from the first mode to the second mode, in a case where the preceding vehicle returns to a state before exhibiting the predetermined behavior, the at least one processor is configured to change from the second mode to the first mode and perform the steering control of the vehicle in the first mode.

13. The vehicle control apparatus according to claim 1, wherein after changing from the first mode to the second mode, in a case where the detector detects that the preceding vehicle moves across the division line, the at least one processor is configured to change from the second mode to the first mode and perform the steering control of the vehicle in the first mode.

14. The vehicle control apparatus according to claim 1, wherein the at least one processor is configured to
determine, based on the detection result of the detector, whether a second preceding vehicle traveling ahead the preceding vehicle exhibits the predetermined behavior in the vehicle width direction, and
in a case of determining that the second preceding vehicle exhibits the predetermined behavior during the steering control of the vehicle in the first mode, change from the first mode to the second mode and perform the steering control of the vehicle in the second mode.

15. A vehicle comprising a vehicle control apparatus according to claim 1.

16. A control method of performing traveling control of a vehicle, the method comprising:
determining, based on a detection result of a peripheral status of the vehicle, whether a preceding vehicle exhibits a predetermined behavior in a vehicle width direction; and
performing steering control of the vehicle in one of a plurality of modes, that include a first mode in which the steering control of the vehicle is performed based on a division line, and a second mode in which the steering control of the vehicle is performed based on the preceding vehicle,
wherein
the predetermined behavior includes that a moving amount of the preceding vehicle in a first direction of the vehicle width direction exceeds a first threshold,
the first threshold is changed in accordance with a type of an adjacent area on a first direction side of a traveling lane on which the vehicle travels in the first direction of the vehicle width direction, and
in a case of determining that the preceding vehicle exhibits the predetermined behavior during the steering control of vehicle in the first mode, the steering control of the vehicle is performed in the second mode by changing from the first mode to the second mode.

17. The vehicle control apparatus according to claim 1, wherein the at least one processor is configured to change the first threshold in accordance with whether the adjacent area is a traveling lane, a road shoulder, or an opposite lane.

18. The vehicle control apparatus according to claim 1, wherein the at least one processor is configured to change the first threshold such that the first threshold is larger when the adjacent area is a road shoulder than when the adjacent area is a traveling lane, and the first threshold is larger when the adjacent area is an opposite lane than when the adjacent area is a road shoulder.

19. The vehicle control apparatus according to claim 4, wherein the at least one processor is configured to change the second threshold in accordance with the type of the adjacent area.

* * * * *